Figure 1:
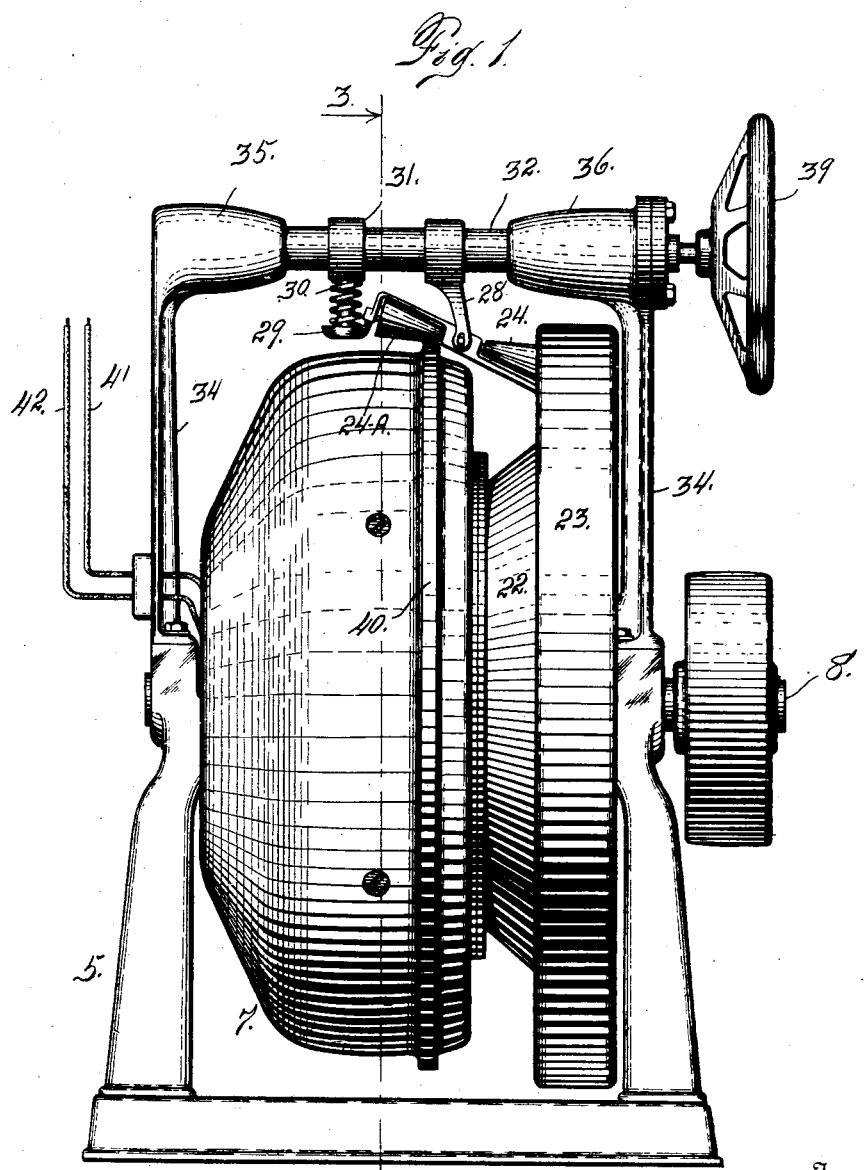

H. A. RHODES.
DIFFERENTIAL SPEED MOTOR.
APPLICATION FILED JULY 20, 1909.

971,148.

Patented Sept. 27, 1910.
3 SHEETS—SHEET 1.

Witnesses
Harry T. Simmons
Otto E. Hoddick

Inventor
Harry A. Rhodes.
By A. F. O'Brien.
Attorney

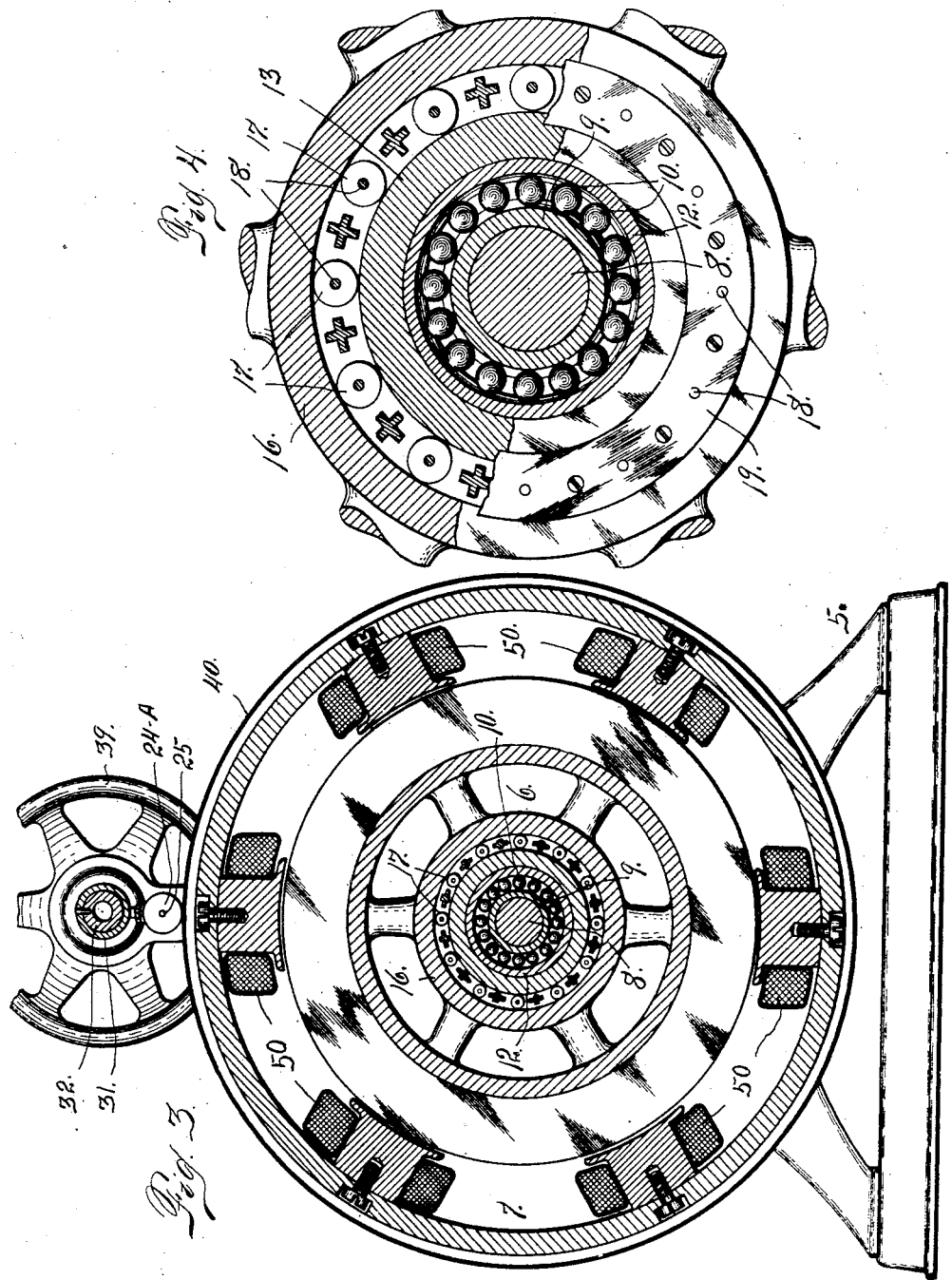

UNITED STATES PATENT OFFICE.

HARRY A. RHODES, OF DENVER, COLORADO, ASSIGNOR TO THE UNIVERSAL MOTOR COMPANY, OF DENVER, COLORADO, A CORPORATION OF ARIZONA TERRITORY.

DIFFERENTIAL-SPEED MOTOR.

971,148. Specification of Letters Patent. Patented Sept. 27, 1910.

Application filed July 20, 1909. Serial No. 508,655.

*To all whom it may concern:*

Be it known that I, HARRY A. RHODES, a citizen of the United States, residing in the city and county of Denver and State of Colorado, have invented certain new and useful Improvements in Differential-Speed Motors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in electric motors, of the class in which both members of the motor are mounted and connected to rotate in opposite directions, and in which a third member is suitably connected therewith to utilize the differential speed of the two motor members. These members will be referred to in this specification as field and armature members, though as stated, in my companion application for electric motors, filed July 20th, 1909, Serial Number 508,654, it is not necessary that these members should always have the relation to each other signified by the terms "armature" and "field," in fact when the two members are rotating it may be stated that the terms armature and field may be interchangeable.

The object of a motor of the class herein disclosed, as set forth in my companion application, is to utilize the differential speed resulting from the rotation of the two members in opposite directions, whereby the ordinary speed reducing means interposed between the motor and the part to be operated thereby, is dispensed with, giving my improved construction an important advantage in point of efficiency. No matter how rapidly the two motor members are rotating in opposite directions, by means of a regulator, any desired differential speed may be maintained and transmitted to the part, member or device to be operated by the motor.

In my improved construction the two motor members are respectively equipped with annularly arranged bearing rings, separated by a space of sufficient magnitude to receive rollers connected with the third member, or that adapted to receive and utilize the differential speed of the motor members. It is evident that the third member will remain stationary if the two bearing rings travel at equal peripheral speeds. In this event the rollers whose spindles are journaled in the third member, will be rotated upon their individual axes, but will have no orbital travel, since the two bearing rings rotating in opposite directions will coöperate to rotate the rollers upon their individual axes, while each will neutralize the action of the other ring, so far as orbital travel is concerned. When, however, through the instrumentality of a suitable speed regulating device, a suitable differential speed between the two motor members is maintained, this speed differential will be imparted to the third member. It is now assumed that the differential speed will be such that one of the bearing rings will have a peripheral travel greater than that of the other bearing ring, in which event the third member, upon which the rollers are mounted, will be rotated and the rollers will have an orbital travel in the direction of the bearing ring, having the greater peripheral speed.

The principles employed in my present construction are substantially the same as set forth in a simultaneously pending companion application, in which the broad claims for a differential speed motor are incorporated. In this application a different form of construction is employed, and will be preferable in cases where there is not room to use the relatively long construction set forth in the companion application. In my present construction the third member adapted to receive the differential speed from the motor members, is inclosed by and centrally located within the motor casing. The third member is keyed or splined on a shaft passing through the motor, and has its axis coincident with the motor axis or the axes of the two motor members. Also in my present construction the screw shaft for operating or adjusting the speed regulating device, is mounted upon an upright frame work outside of the motor casing, the regulating device being exposed to view when the motor is in use.

Having briefly outlined my improved construction I will proceed to describe the same in detail, reference being made to the accompanying drawing in which is illustrated an embodiment thereof.

Figure 2:
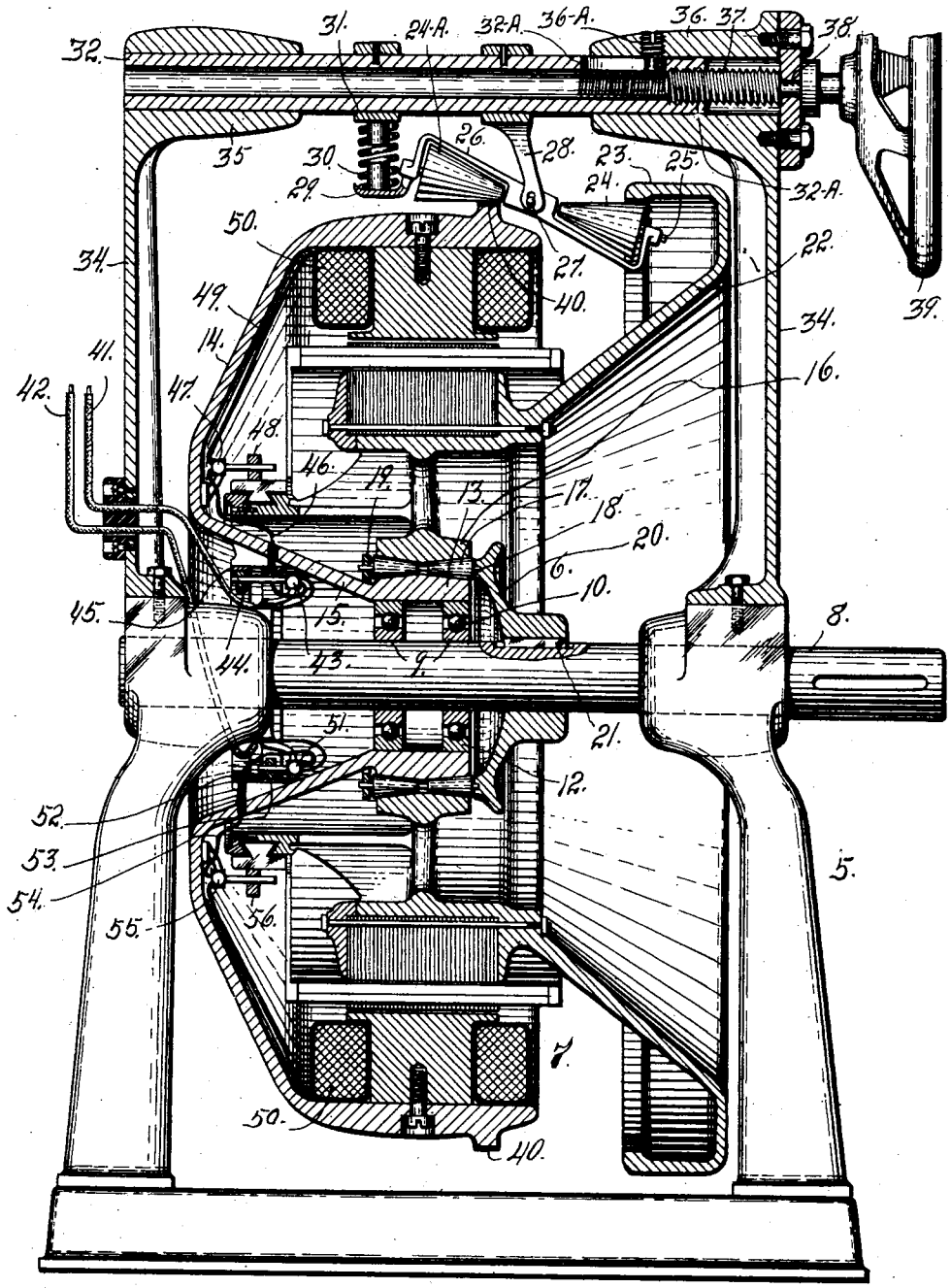

In this drawing: Figure 1 is a side elevation of a motor equipped with my improvements. Fig. 2 is a central vertical section of same, the parts being shown on a larger scale. Fig. 3 is a section taken approximately on the line 3—3 Fig. 1. Fig. 4 is a view similar to Fig. 3, showing the central part of the motor on a larger scale.

The same reference characters indicate the same parts in all the views.

Let the numeral 5 designate a suitable frame work, upon which the motor is mounted. This motor is composed of two members mounted and connected to rotate in reverse directions. The inner member, which I will for convenience designate the armature member, is indicated by the numeral 6, while the outer member which is for convenience termed the field member, will be designated by the numeral 7. Journaled in the said frame work 5 is a shaft 8, upon which is mounted and made fast a pair of steel bearing rings 9, engaged by ball bearings 10, interposed between the rings 9 and two other rings 12, mounted upon a bearing ring 13, carried by the housing part 14, of the field member 7, the said housing part being formed into a centrally located sleeve 15, terminating in the annular ring 13, surrounding the shaft 8, but movable independently thereof. The armature member 6 of the motor, is also provided with an annular bearing ring 16, which is located outside of and surrounding the bearing ring 13, sufficient space being left between the two bearing rings to receive a series of rollers 17, mounted on spindles 18, journaled at one extremity in a ring 19, and at their opposite extremity in the hub member 20, keyed to the shaft 8, as shown at 21. If we assume that the two bearing rings are rotating at equal peripheral speeds in opposite directions, it will be understood that as the rollers 17 are free to rotate on their individual axes (and if the two bearing rings 13 and 16 are rotating at the same peripheral speed, and in opposite directions) the two rings, while imparting to the rollers rotation upon their individual axes, will impart no orbital travel to the rollers and consequently no rotary movement to the hub 20 or the shaft 21. However, if it be assumed that the two bearing rings 13 and 17 are traveling at different peripheral speeds, it is evident that the rollers 17 will have orbital travel in the direction of the bearing ring having the more rapid peripheral speed, and this travel will be communicated to the hub 20, and the shaft 8, this speed being proportional to the differential speed of the two motor members.

The armature member 6, is provided with an outwardly flared part 22, terminating in an inwardly bent flange 23, adapted to engage a cone 24, fast upon a spindle 25, carrying a second cone 24$^A$, the spindle being journaled in a bracket 26, trunnioned as shown at 27, upon a support 28, depending from the stationary frame work of the machine.

The bracket 26 is provided at one extremity with an extension 29, engaging one extremity of a coiled spring 30, whose upper extremity engages a sleeve 31, surrounding a tube 32, mounted upon uprights 34, of the frame work. This tube 32 is longitudinally movable in end sleeves 35 and 36, with which the uprights 34 are equipped, and it is locked against turning by a set screw 36$^A$ which passes through a slot 32$^A$ formed in the tube and of sufficient length to permit the necessary travel of the latter. Upon the tube is mounted and made fast the support 28 for the bracket 26 of a speed regulating device. One extremity of the tube 32 is interiorly threaded, as shown at 32$^A$, and is engaged by a screw 37, journaled in the frame work, as shown at 38, the exterior extremity of the screw being equipped with an operating hand wheel 39. It is evident that if the hand wheel 39 be rotated, the tube 32 will be moved longitudinally in one direction or the other, according as it is necessary to shift the speed regulating device. The cone 24 of the speed regulating device, engages the flange 23, belonging to the armature member of the motor, while the cone 24$^A$ engages a bearing part 40, formed on the field member of the motor. Now if we assume that the two motor members are rotating in opposite directions at uniform speed, it is evident that their speeds may be varied by adjusting the speed regulating device. Since the parts of the two motor members which engage the respective cones of the speed regulating device, are of the same or approximately the same circumference, it is evident that if the speed regulating device be so adjusted that the parts bearing upon the respective cones engage the latter centrally or where the two cones are of the same circumference, the two motor members will rotate at the same speed. Now if it is desired to adjust the two members to produce any desired differential, the speed regulating device may be shifted by operating the hand wheel 39, to bring one of the motor bearing parts to engage the small extremity of one cone while the other motor bearing part is caused to engage the larger extremity of the other cone. This adjustment will produce a speed differential (see Fig. 2) in favor of the armature member, and this differential will be communicated to the hub 18 and the shaft 8, through the instrumentality of the series of rollers 17, as heretofore explained.

Attention is called to the fact that the motor, for the purpose of current supply, is connected with two electric conductors, 41 and 42, the conductor 41 leads to a binding post 43, connected with a brush 44, leading to a ring 45. A conductor 46 also leads from the binding post 43 to a similar binding post 47, with which is connected a commutator brush 48. From the binding post 47 also leads a conductor 49, to the field coils 50 of the motor, while the conductor 42 leads to a binding post 51, upon which is mounted a brush 52, leading to a ring 53. Also from the binding post 51 leads a conductor 54, to a binding post 55, upon which is mounted a commutator brush 56.

It will be understood from the foregoing, that if it is desired to rotate the shaft 8, at a relatively low speed, the result may be obtained by utilizing the speed differential, resulting from the rotation of the two motor members in opposite directions, and so regulating the rotation of the said members that the necessary or desired speed differential may be obtained. It is also evident that by means of the device for shifting the speed regulator, the differential may be changed from one motor member to the other at will. In this event the direction of rotation of the shaft 8, will be reversed, and its speed will be in harmony with the speed differential required, the same being determined by the adjustment of the speed regulating device, in the manner just explained.

Having thus described my invention, what I claim is:

1. A motor having its two members mounted and connected to rotate in reverse directions, the two motor members being equipped with centrally located annularly arranged bearing rings, a third member connected in operative relation with the bearing rings to utilize the differential speed of the two motor members, and a shaft upon which the third member is mounted for the purpose set forth.

2. An electrical motor whose field and armature members are adapted to rotate in reverse directions, means for regulating the speed of the two members to produce any desired differential speed, the motor members being equipped with annularly arranged parts, centrally located within the motor casing, and a third member also centrally located and connected with the said parts of the motor members, to utilize the differential speed of the said members.

3. A motor whose field and armature members are mounted to rotate in reverse directions, the said members having circumferential bearing parts, and an exteriorly located speed regulation device consisting of a spindle, and two cones fast on the spindle, the said cones engaging said bearing parts, and adjustable to produce any desired differential speed, and a third member connected in operative relation with the two motor members for utilizing the aforesaid differential speed.

4. An electrical motor whose field and armature members are mounted and connected to rotate in reverse directions, the two members having exteriorly located parts, of approximately equal circumferences, a speed regulating device consisting of a spindle and two cones fast on the spindle, a bracket in which the spindle is journaled, a support for the bracket, and means for shifting the bracket support, whereby the speed regulating device may be adjusted to produce any desired differential speed between the two motor members, the latter being equipped with centrally located annularly arranged bearing parts, and a third member connected in operative relation with the said bearing parts, for utilizing the differential speed of the two motor members, substantially as described.

5. A motor whose field and armature members are constructed and connected to rotate in opposite directions, a centrally located shaft, one of the motor members having a bearing ring journaled on the shaft, the other motor member having an opposing bearing ring, surrounding the bearing ring of the other member, a third member fast on the shaft and connected in operative relation with the two bearing rings, and a speed regulating device connected in operative relation with the two motor members and adjustable to produce any desired differential speed, the latter being communicated to the third part through the instrumentality of the aforesaid bearing rings, substantially as described.

6. An electrical motor whose armature and field members are mounted to rotate in opposite directions, the said members having exteriorly exposed bearing parts, a speed regulator also exteriorly located and engaged by the said bearing parts, the regulator carrying cone shaped members arranged to act in reverse relation upon the said bearing parts, and means for adjusting the speed regulator to produce any desired differential speed between the two motor members, the latter having centrally located parts annularly arranged, and a third member connected in operative relation with the annularly arranged parts of the two motor members, to utilize the differential speed of the two members, substantially as described.

7. A motor whose two members are mounted to rotate in opposite directions, an exteriorly located speed regulating device, connected in operative relation with exposed parts of the two motor members, an exposed tube mounted to move longitudinally, the speed regulating device being connected with the said tube, and an operating screw, engaging interior threads of the said tube for shifting the latter for adjusting the speed regulator, and means connected in operative relation with the two motor members for utilizing the differential speed thereof, substantially as described.

In testimony whereof I affix my signature in presence of two witnesses.

HARRY A. RHODES.

Witnesses:
A. J. O'BRIEN,
JESSIE F. HOBART.